(12) United States Patent
Murayama

(10) Patent No.: US 7,686,157 B2
(45) Date of Patent: Mar. 30, 2010

(54) CONVEYOR

(75) Inventor: Hiroshi Murayama, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 12/331,191

(22) Filed: Dec. 9, 2008

(65) Prior Publication Data

US 2009/0166159 A1 Jul. 2, 2009

(30) Foreign Application Priority Data

Dec. 28, 2007 (JP) ............................. 2007-340150

(51) Int. Cl.
*B65G 39/16* (2006.01)
(52) U.S. Cl. .................. 198/806; 198/810.03
(58) Field of Classification Search ................ 198/806, 198/810.03
See application file for complete search history.

(56) References Cited

U.S. PATENT DOCUMENTS

| | | | | |
|---|---|---|---|---|
| 2,239,687 A | * | 4/1941 | Parker | 198/806 |
| 3,368,665 A | * | 2/1968 | Jinkins | 198/806 |
| 5,950,806 A | * | 9/1999 | Warneke | 198/806 |
| 6,116,410 A | * | 9/2000 | Malmberg | 198/806 |
| 6,131,726 A | * | 10/2000 | Hovsto et al. | 198/806 |
| 6,390,287 B2 | * | 5/2002 | Riffe | 198/810.03 |

FOREIGN PATENT DOCUMENTS

| | | |
|---|---|---|
| JP | 01-058517 | 4/1989 |
| JP | 04272042 A | 9/1992 |
| JP | 2514516 | 10/1996 |
| JP | 09175627 A | 7/1997 |
| JP | 2003176009 A | 6/2003 |
| JP | 2006-137588 | 6/2006 |

OTHER PUBLICATIONS

Japanese language office action and its English language translation for corresponding Japanese application 2007340150 lists the references above.

* cited by examiner

*Primary Examiner*—James R Bidwell
(74) *Attorney, Agent, or Firm*—Hogan & Hartson LLP

(57) ABSTRACT

A belt conveyor includes right and left detection rollers outside ends in a width direction of a belt. Right and left correction rollers are disposed on right and left sides on a rear face of the belt. When one of the detection rollers is pressed by the belt, the corresponding correction roller is inclined from the pressed detection roller down to a center of the belt, thereby correcting the meandering belt.

16 Claims, 4 Drawing Sheets

CONVEYOR

CROSS-REFERENCE TO RELATED APPLICATIONS

This application claims the benefit of priority under 35 USC 119 of Japanese patent application no. 2007-340150, filed on Dec. 28, 2007, which is incorporated herein by reference.

BACKGROUND OF THE INVENTION

1. Field of the Invention

The present invention relates to a belt conveyor, and particularly relates to correction of a meandering belt.

2. Description of the Related Art

Belt conveyors sometimes have a problem during operation in that horizontal misalignment of the belt and the like results in meandering of the belt. In order to correct the meandering belt, applicant previously proposed a technique of detecting horizontal misalignment of the belt with a sensor and lifting up a meandering correction roller with a motor (Refer to Japanese Unexamined Utility Model Application No. H01(1989)-58517). However, this technique requires a large mechanism including the sensor that detects horizontal misalignment and the motor for meandering correction. A more convenient method for correcting a meandering belt conveyor is needed.

SUMMARY OF THE INVENTION

In order to overcome the problem described above, the present invention corrects a meandering belt of a conveyor without using a meandering detection sensor. The present invention also corrects a meandering belt by actuating a correction roller without using a lifting motor.

The present invention provides a belt conveyor including a corrector for a meandering belt. Right and left detection rollers are disposed outside outer ends in a width direction of the belt. Right and left correction rollers are disposed on right and left sides under the belt to contact a rear face of the belt to correct the meandering belt. The meandering connector also includes inclining means for inclining, when one of the right and left detection rollers is pressed by the belt, the correction roller disposed on the side of the pressed detection roller such that the correction roller is inclined downward from the pressed detection roller toward a center of the belt. In one embodiment, the inclining means has right and left cams each of which has a face inclined upward from the outer end toward the center of the belt and is shifted to right and left below the rear face of the belt in conjunction with the corresponding detection roller; and supporting members that are lifted along the inclined faces of the cams and regulate levels of the correction rollers in right and left directions of the belt. The belt conveyor may also includes a frame that extends from right to left below the rear face of the belt; and biasing members that bias the cams toward the center of the belt. The cams are attached to the frame to be slidable to the right and left, and lower ends of support rods of the detection rollers are attached to the cams.

According to the present invention, when the belt meanders to press one of the detection rollers, the inclining means inclines the correction roller disposed on the side of the pressed detection roller so that the correction roller is inclined downward from an outer end toward the center of the belt. Accordingly, the belt is applied with force to correct the meandering. The present invention thus realizes correction of meandering without using a sensor that detects a meandering belt.

When the detection roller is pressed by the belt, the corresponding cam below the rear face of the belt may be shifted to the right or left to incline the correction roller by combining the cam face inclined upward from the right or left end toward the center of the belt with the supporting member of the correction roller that is lifted along the inclined face of the cam. This configuration requires no motor to drive the correction roller. Accordingly, a meandering corrector is provided that promptly and surely responds to meandering and causes less malfunction. In addition, the cams may be attached slidably to right and left to a frame that extends from right to left below the rear face of the belt, and the lower ends of the support rods of the detection rollers may be attached to the cams. Biasing members may be provided that bias the cams toward the center of the rear face of the belt. In this configuration, when one of the detection rollers is pressed by the belt and is shifted, the corresponding cam is surely shifted and the corresponding correction roller is regulated to be inclined in accordance with the degree of meandering of the belt.

Other features, elements, processes, steps, characteristics and advantages of the present invention will become more apparent from the following detailed description of embodiments of the present invention with reference to the attached drawings.

DETAILED DESCRIPTION OF EMBODIMENTS OF THE INVENTION

Figure 1:
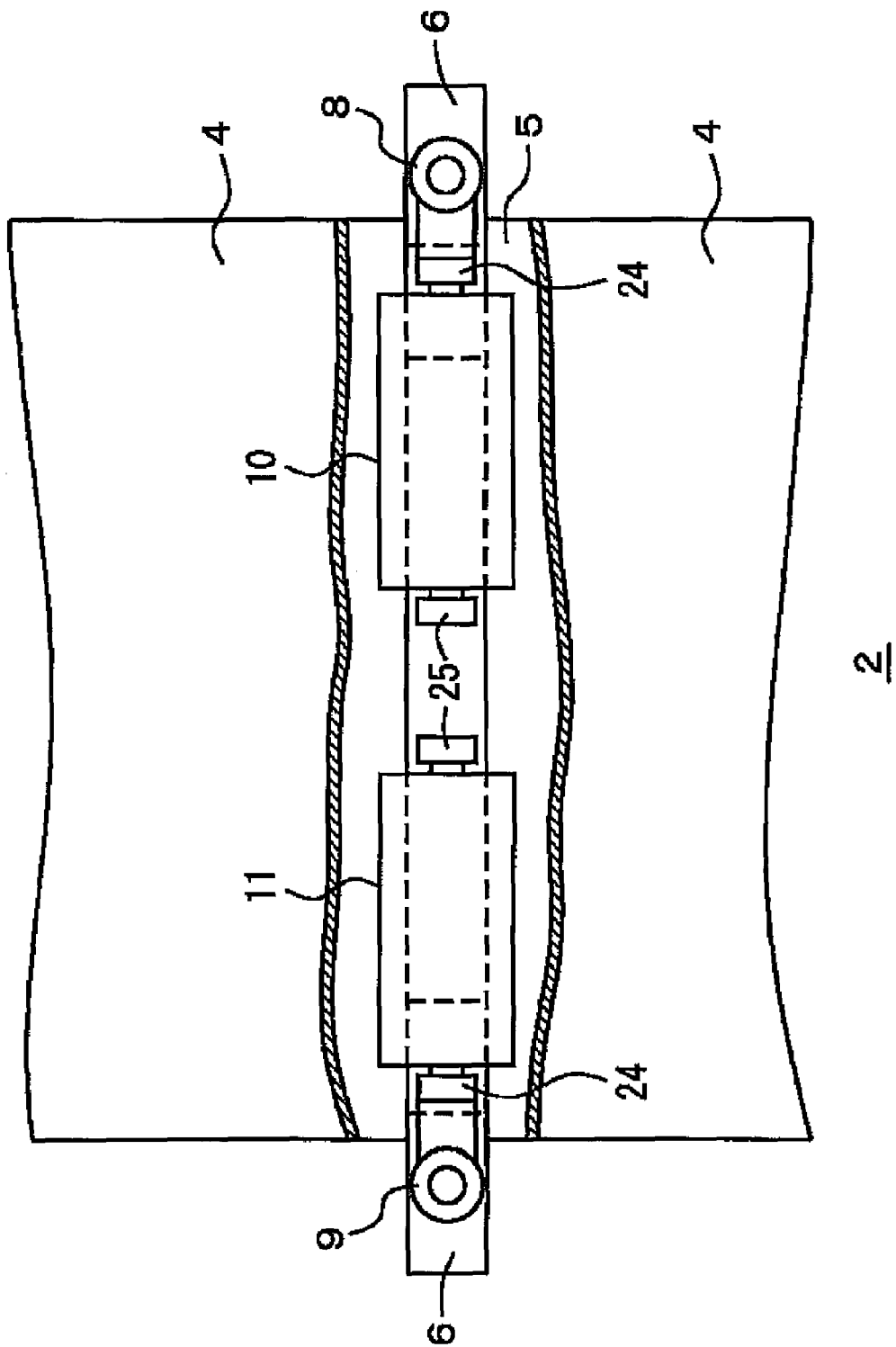
FIG. 1 is a plan view illustrating a main part of a conveyor with a partial cutout of an outgoing belt, according to an embodiment of the present invention.
Figure 2:
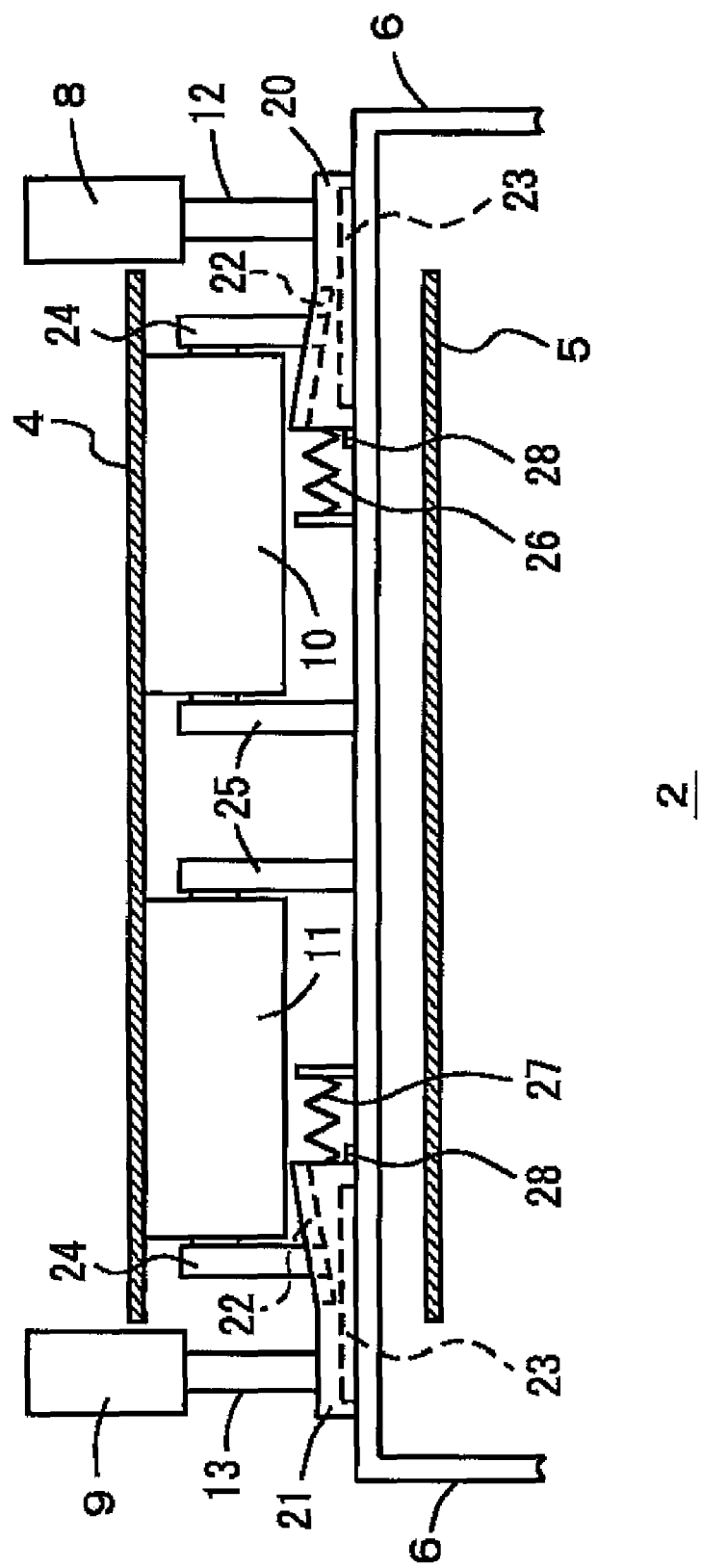
FIG. 2 is a vertical cross sectional view of the main part of the conveyor according to the embodiment of the present invention.

Embodiments of the present invention are described below.

FIGS. 1-4 illustrate a belt conveyor 2 according to embodiments of the invention. The belt conveyor 2 includes an outgoing belt 4 and a returning belt 5, each made of steel, rubber, or the like. A steel belt is particularly suitable for the present invention, as a meandering steel belt creates a dangerous situation. In this specification, right and left indicate directions orthogonal to traveling directions of the belts 4 and 5 in a horizontal plane, and belts 4 and 5 travel in, for example, a horizontal direction (up-and-down direction of FIG. 1, for example).

A frame 6 extending from right to left is interposed between the outgoing belt 4 and the returning belt 5, and a pair of detection rollers 8 and 9 are disposed outside right and left ends of the outgoing belt 4. A pair of right and left correction rollers 10 and 11 are provided to be in contact with a rear face of the outgoing belt 4. Support rods 12 and 13 of the detection rollers 8 and 9 are fixed to right and left cams 20 and 21 which each have a cam groove 22. The cam groove 22 is inclined downward from a center toward the right or left end of the outgoing belt 4 (that is, the cam groove 22 is inclined upward from the right or left end toward the center of the belt). The cams 20 and 21 are shifted slidably to the right and left by raised parts 23 provided on the frame 6.

Each of the correction rollers 10 and 11 is supported by a post 25 around the center of the outgoing belt 4, and is supported by a post 24 on the outer end of the outgoing belt 4. The cams 20 and 21 are biased toward the center of the rear face of the outgoing belt 4 by biasing members 26 and 27. When the outgoing belt 4 is located at a normal position, the detection roller 8 is regulated by a stopper 28 at a position not in contact with the outgoing belt 4.

A plurality of meandering correctors each including components 6-28 may be disposed along the belts 4 and 5. Idler rollers, driving rollers, and the like may also be disposed between the meandering correctors. According to this embodiment, each of the cams 20 and 21 is provided with the cam groove 22 to guide the post 24. Alternatively, each of the cams 20 and 21 may be provided with a projection to guide the post 24. Further alternatively, each of the cams 20 and 21 may be provided with a raised part that is slidable in a groove formed in the frame 6.

Figure 3:
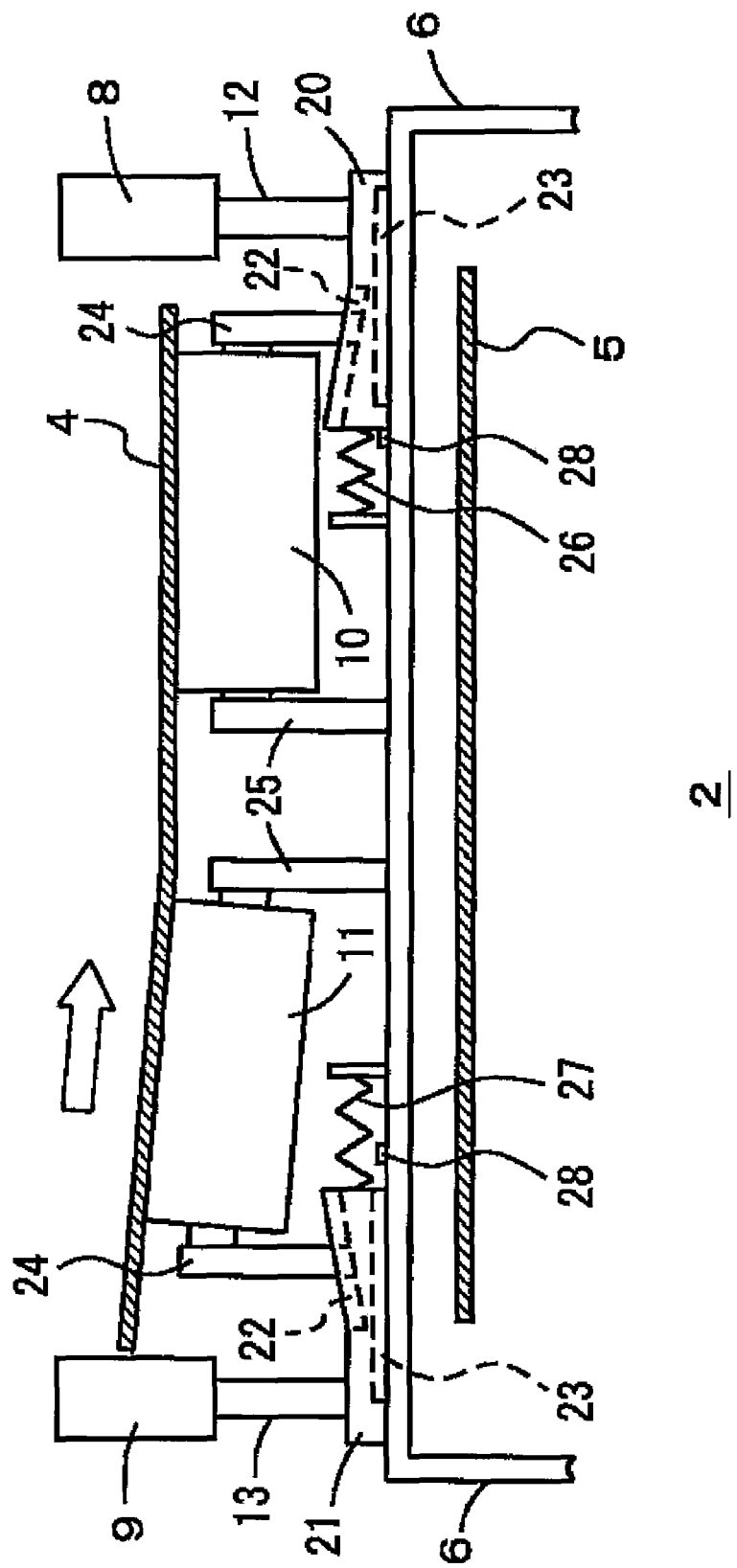
FIG. 3 illustrates an operating state of the conveyor according to the embodiment of the present invention.

Operations according to the present embodiment of the invention are described below. FIG. 3 illustrates an example in which the outgoing belt 4 has meandered to the left to slide the left detection roller 9 to the left. The cam 21 is then slid to left via the support rod 13 and the post 24 is thus lifted up along the cam groove 22, so that the correction roller 11 becomes inclined downward from the outer end toward the center of the belt. The degree of inclination of the correction roller 11 is increased as the outgoing belt 4 meanders more dramatically. Inclination of the correction roller 11 corrects meandering of the outgoing belt 4 (i.e. causes belt 4 to meander back to the right toward its normal position). When the meandering is corrected, the cam 21 is returned to a normal position by the biasing member 27 and is stopped by the stopper 28.

Figure 4:
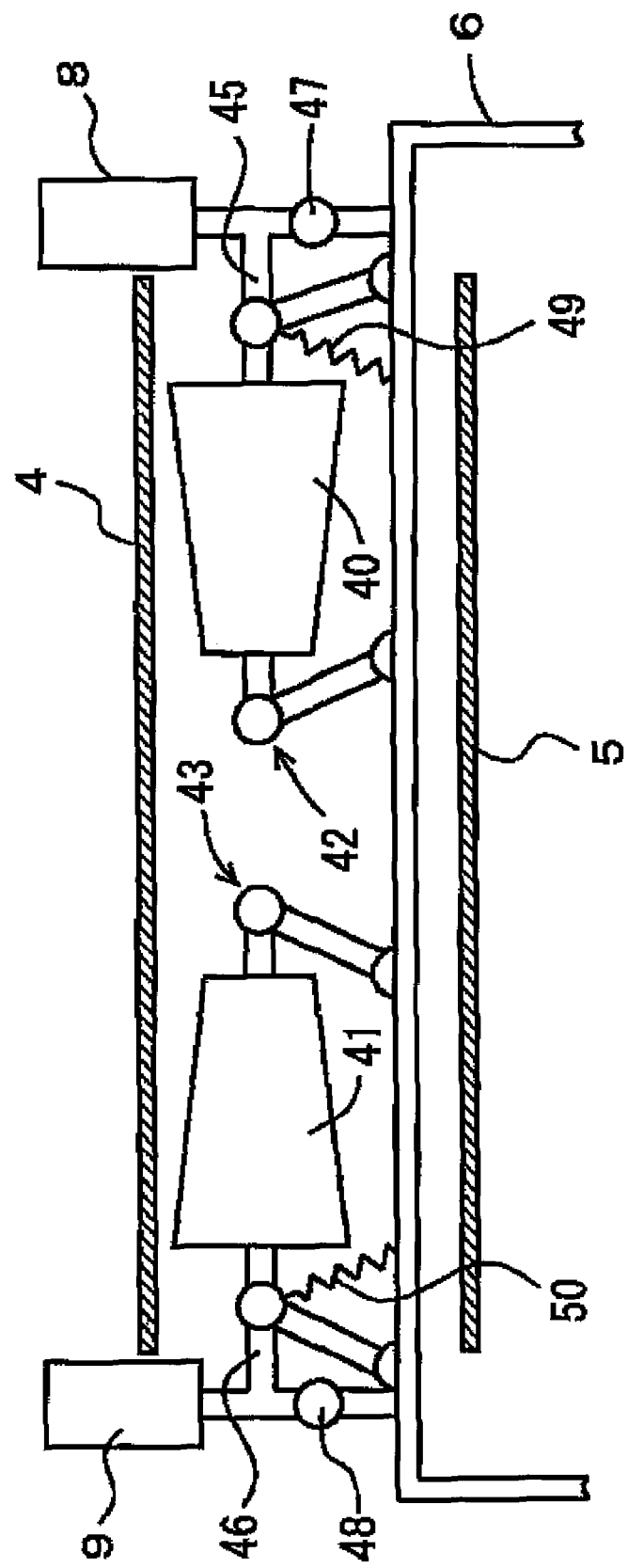
FIG. 4 is a vertical cross sectional view of a main part of a conveyor according to a modified embodiment of the present invention.

FIG. 4 illustrates a modified meandering corrector. A pair of right and left correction rollers 40 and 41 are provided, each of which has a conical shape and is inclined downward from its outer end toward the center of the belt 4. The meandering corrector also includes four-joint links 42 and 43, arms 45 and 46 that transmit motion of the detection rollers 8 and 9 to the four-joint links 42 and 43, and rotational axes 47 and 48. When the belt 4 meanders and the detection roller 9 is pressed by the belt 4 to be rotated about the rotational axis 48, the correction roller 41 is lifted up by the four-joint link 43 to correct meandering of the belt 4. When the meandering is corrected, the correction roller 41 is lowered by a biasing member 50 down to a position not in contact with the belt 4. The right correction roller 40 operates similarly to the left correction roller 41.

While the present invention has been described with respect to embodiments thereof, the invention may be modified in numerous ways and may assume many embodiments other than those specifically set out and described above. Accordingly, the appended claims cover all modifications that fall within the true spirit and scope of the present invention.

What is claimed is:

1. A belt conveyor having a meandering corrector for a meandering belt, the meandering corrector comprising:
    right and left detection rollers that are disposed outside outer ends in a width direction of the belt;
    right and left correction rollers that are disposed on right and left sides under the belt to contact a rear face of the belt to correct the meandering belt; and
    inclining means for inclining, when one of the detection rollers is pressed by the belt, the correction roller disposed on the side of the pressed detection roller such that the correction roller is inclined downward from the pressed detection roller towards a center of the belt.

2. The belt conveyor according to claim 1, wherein the inclining means comprises:
    right and left cams each of which has a face inclined upward from the outer end toward the center of the belt and is shifted to right and left below the rear face of the belt in conjunction with the corresponding detection roller; and
    supporting members that are lifted along the inclined faces of the cams and regulate levels of the correction rollers in right and left directions of the belt.

3. The belt conveyor according to claim 2, further comprising:
    a frame that extends from right to left below the rear face of the belt; and
    biasing members that bias the cams toward the center of the belt, wherein
    the cams are attached to the frame to be slidable to the right and left, and
    lower ends of support rods of the detection rollers are attached to the cams.

4. The belt conveyor according to claim 2, wherein each of the cams has a groove to guide the supporting members.

5. The belt conveyor according to claim 2, wherein each of the cams has a projection to guide the supporting members.

6. The belt conveyor according to claim 1, wherein the correction rollers have a cylindrical shape.

7. The belt conveyor according to claim 1, wherein inclining means comprises:
    rotational axes about which the detection rollers rotate when pressed by the belt; and
    linkages that transmit rotational motion of the detection rollers to lift up the correction rollers.

8. The belt conveyor according to claim 7, wherein the linkages are four-joint links.

9. The belt conveyor according to claim 7, wherein the correction rollers have a conical shape.

10. The belt conveyor according to claim 7, and further comprising biasing members that bias the correction rollers downward to a position not in contact with the belt.

11. A belt conveyor having a corrector for correcting meandering of a belt, the corrector comprising:
    a detection roller disposed on a side of the belt;
    a correction roller disposed underneath the belt; and
    a linkage connecting the detection and correction rollers that lifts the correction roller into contact with the belt when the belt presses against the detection roller.

12. The belt conveyor according to claim 11, wherein the linkage inclines the correction roller relative to the belt.

13. The belt conveyor according to claim 12, wherein the linkage inclines the correction roller in a downward direction from the side to a center of the belt.

14. The belt conveyor according to claim 11, comprising right and left detection rollers, right and left correction rollers, and right and left linkages.

15. The belt conveyor according to claim 11, wherein the linkage is a cam mechanism.

16. The belt conveyor according to claim 11, wherein the linkage is a rotational mechanism.

* * * * *